United States Patent [19]

Miller

[11] 4,184,639

[45] Jan. 22, 1980

[54] SIDE WALKING IRRIGATION SYSTEM

[75] Inventor: Charles S. Miller, Cordele, Ga.

[73] Assignee: Miller Brothers Farms, Inc., Cordele, Ga.

[21] Appl. No.: 923,153

[22] Filed: Jul. 10, 1978

[51] Int. Cl.² .............................................. B05B 3/00
[52] U.S. Cl. .................................... 239/177; 137/344; 239/212
[58] Field of Search ....................... 239/177, 189, 212; 137/344

[56] References Cited

U.S. PATENT DOCUMENTS

| 2,726,895 | 12/1955 | Behlen ........................... 239/212 X |
| 3,342,417 | 9/1967 | Dowd ................................ 239/177 |
| 3,394,729 | 7/1968 | Bower et al. ................... 239/212 X |
| 3,587,763 | 6/1971 | Kinkead ........................ 137/344 X |
| 3,780,947 | 12/1973 | Ririe et al. ......................... 239/177 |
| 3,811,617 | 5/1974 | Cornelius ....................... 239/212 X |

Primary Examiner—Johnny D. Cherry
Attorney, Agent, or Firm—Newton, Hopkins & Ormsby

[57] ABSTRACT

A first steerable prime mover wheeled tower and a plurality of laterally spaced intermediate and end towers collectively carry a horizontal irrigation conduit which receives water through a hose dragged behind the prime mover wheeled tower. The irrigation conduit is supported by a truss structure extending between the tops of the several towers. Electric drive motors on the individual towers are powered in proper sequence to cause the intermediate and end wheeled towers to follow the linear path of the prime mover wheeled tower without appreciable lag. A system of control switches responds to tension in a control cable connected with a spring-loaded crank element on the prime mover wheeled tower to produce automatic activation of the control switches.

11 Claims, 4 Drawing Figures

SIDE WALKING IRRIGATION SYSTEM

BACKGROUND OF THE INVENTION

In the field of agricultural irrigation, traveling sprinklers are well known including those that move in a circular path around a center pivot, and those which traverse fields on linear paths, the latter type of sprinkler being known in the art as a "side-walking" sprinkler. The present invention relates to improvements in this latter type of irrigation apparatus.

In the prior art, side-walking sprinklers are propelled by various means, hydraulic wheel motors operated by water pressure being one mode of operation. Generally speaking, such motive means are quite costly and require a certain degree of water pressure not always available without costly booster pumps and other complications.

The objective of this invention is to provide a side-walking irrigator or sprinkler for crops which is quite simplified and economical in construction compared to the prior art, and in which the several wheeled supporting towers of the apparatus are driven by electric motors which are powered in proper sequence from an engine driven generator on a prime mover steerable wheeled tower which also carries an electric motor driven winch and winch cable for pulling the prime mover tower on a linear path across a field. The irrigation water supply for the system is delivered through a hose coupled to the prime mover tower and from this hose to an overhead horizontal irrigation conduit common to and supported by the several towers and having a suitable number of sprinkler heads or nozzles mounted thereon at spaced intervals.

A very important aspect of the invention involves a plurality of control switches for the electric motors of the wheeled towers which are under control of a cable or wire and an associated spring-urged crank element on the main or prime mover tower. This arrangement causes controlled operation of the several electric drive motors in such a way that the intermediate and end towers follow the linear path of movement initiated by the main or prime mover tower which is also the irrigation water inlet tower.

Other features and advantages of the invention will become apparent during the following detailed description.

To comply with the duty to disclose known prior art under 37 C.F.R. 1.56, the following United States patents are made of record herein:

| | |
|---|---|
| 1,068,796 | 3,241,769 |
| 2,122,596 | 3,583,636 |
| 2,801,132 | 3,771,720 |
| 3,094,282 | 3,811,617 |
| 3,942,722. | |

DETAILED DESCRIPTION

Figure 1:
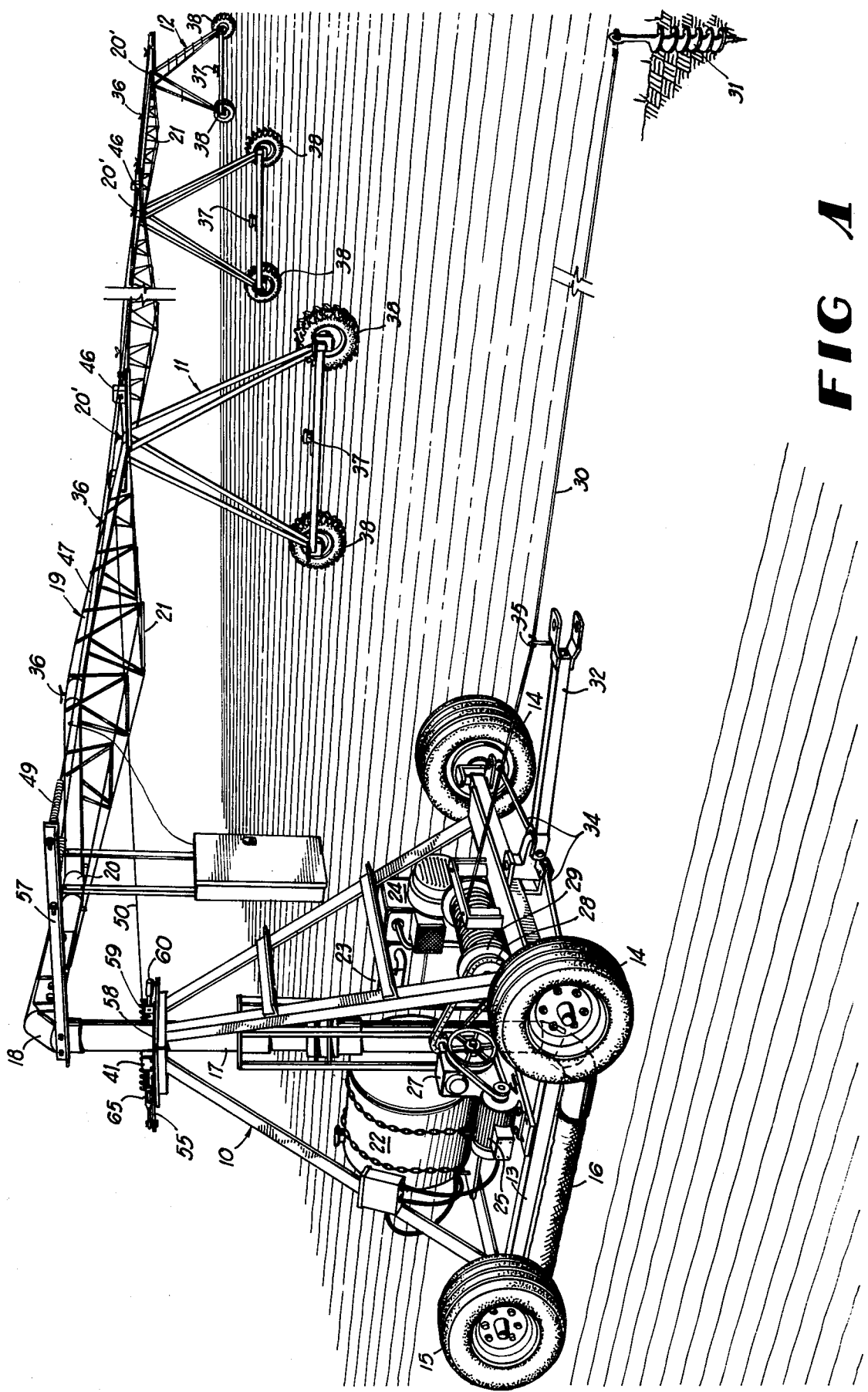
FIG. 1 is a perspective view of an irrigation apparatus embodying the invention.

Referring to the drawings in detail wherein like numerals designate like parts, a crop irrigating apparatus of the "side-walking" type comprises a first or prime mover wheeled tower 10, a required number of laterally spaced intermediate wheeled towers 11, and an end or last wheeled tower 12. Typically, the apparatus may consist of ten spaced towers with an overall length of nearly 1300 feet. The number of towers and the length of the apparatus can be increased or decreased to meet particular needs.

The prime mover tower 10 consists of a base frame 13 having forward steering wheels 14 thereon and rear wheels 15. A trailing hose 16 dragged by the prime mover tower 10 supplies irrigation water to a standpipe 17 arranged centrally on the tower 10 and connected above this tower by an elbow 18 to a generally horizontal long irrigation pipe 19. The pipe 19 is flexibly jointed at 20 between the prime mover tower 10 and the first intermediate tower 11 and at 20' adjacent to the tops of all remaining towers 11 and 12. This enables the long irrigation apparatus to have its sections rise and fall with irregularities in the ground over which it is passing. The flexibly jointed conduit 19 is supported between towers by rigid truss sections 21, as illustrated, and the flexible articulation points 20 and 20' throughout the system are at the ends of the truss sections. Typically, the ground clearance distance beneath the truss sections 21 is about twelve feet.

Mounted on the base frame 13 of the prime mover tower 10 is a fuel tank 22 and a suitable engine 23 supplied with fuel from this tank. The engine 23 drives a generator 24 which supplies current to a winch motor 25 coupled through gearing 26, a speed reducer 27 and additional gearing 28 with a forward horizontal transverse axis winch spool 29 on the base frame 13. A winch cable 30 is wound on the spool 29 and extends forwardly from the tower 10 for connection with a land anchor 31 at the far side of the field being traversed by the irrigation apparatus.

The prime mover tower 10 has a forward steering tongue 32 connected with a front wheel steering linkage 34 of the tower 10. An eye 35 on the tongue 32 receives the winch cable 30 therethrough guidingly so that the prime mover tower 10 will follow a straight path along the cable 30 as the winch spool 29 is operated to wind up the cable.

At a required number of spaced points along the irrigation conduit 19, the same is equipped with a plurality of sprinkler heads 36 or nozzles. It will be understood that the prime mover tower 10 of the apparatus is propelled forwardly along the desired path by the action of winding the cable 30 onto the spool 29 driven by the electric motor 25.

Figure 4:
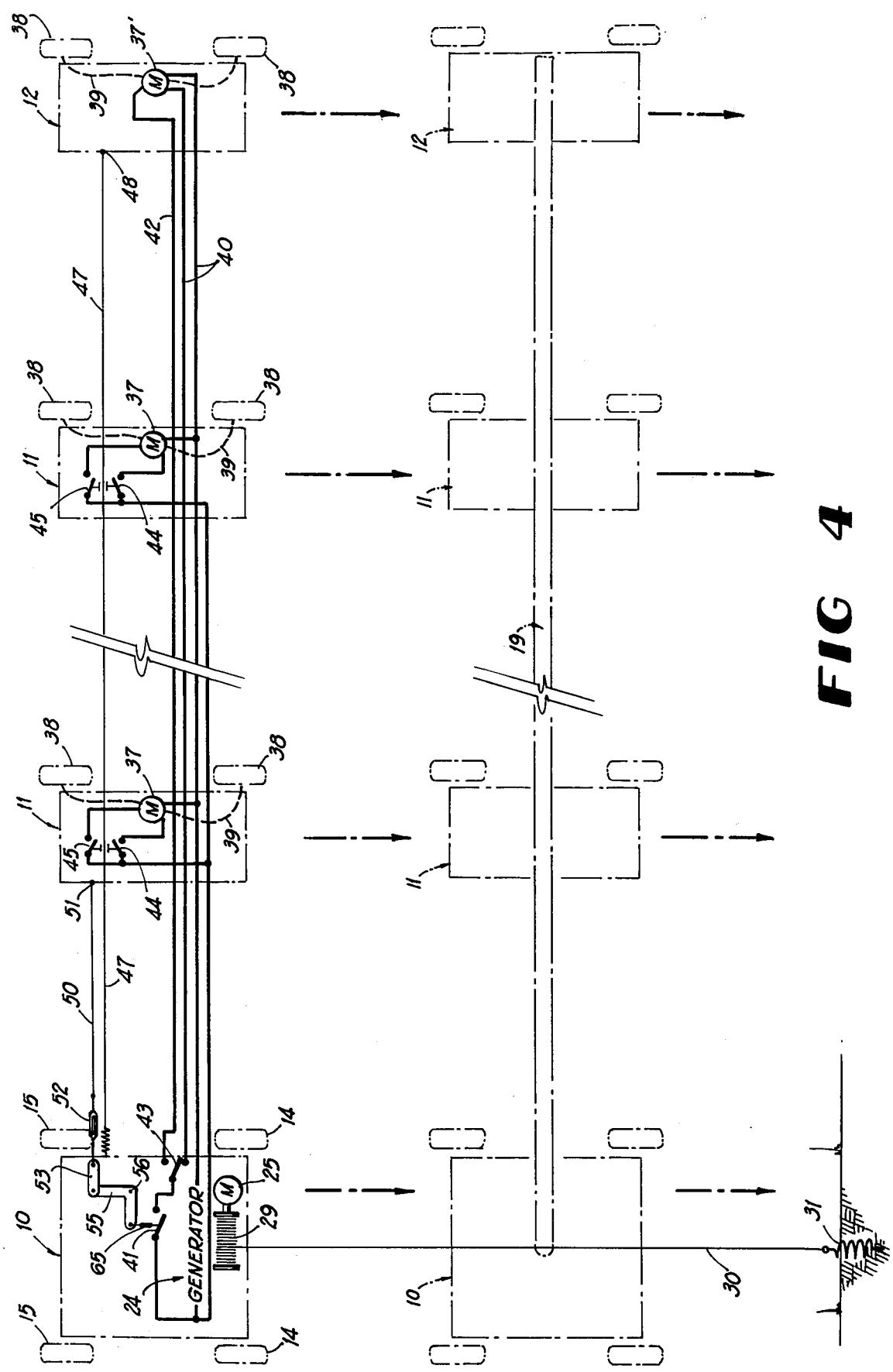
FIG. 4 is a schematic plan view of the irrigation system including its electrical controls.

The individual intermediate and end towers 11 and 12 are all independently driven by electric motors 37 and 37' which are drivingly connected with the two tandem wheels 38 of each tower in any conventional manner indicated schematically at 39 in FIG. 4.

Figure 2:
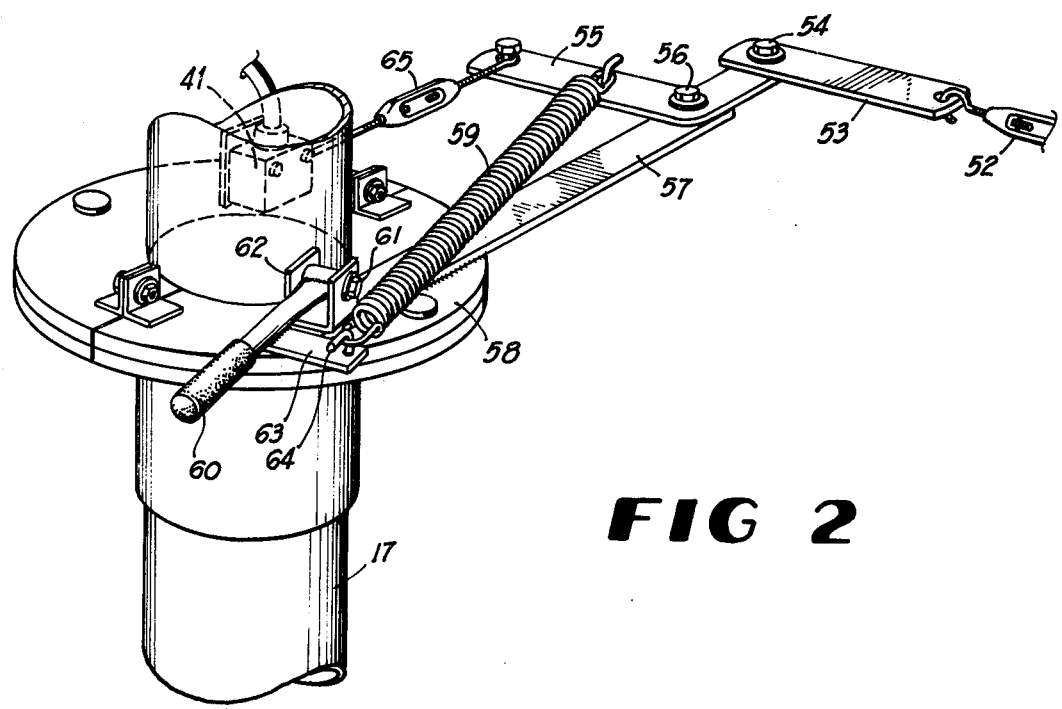
FIG. 2 is an enlarged fragmentary perspective view of a portion of a prime mover tower and associated control switch linkage.
Figure 3:
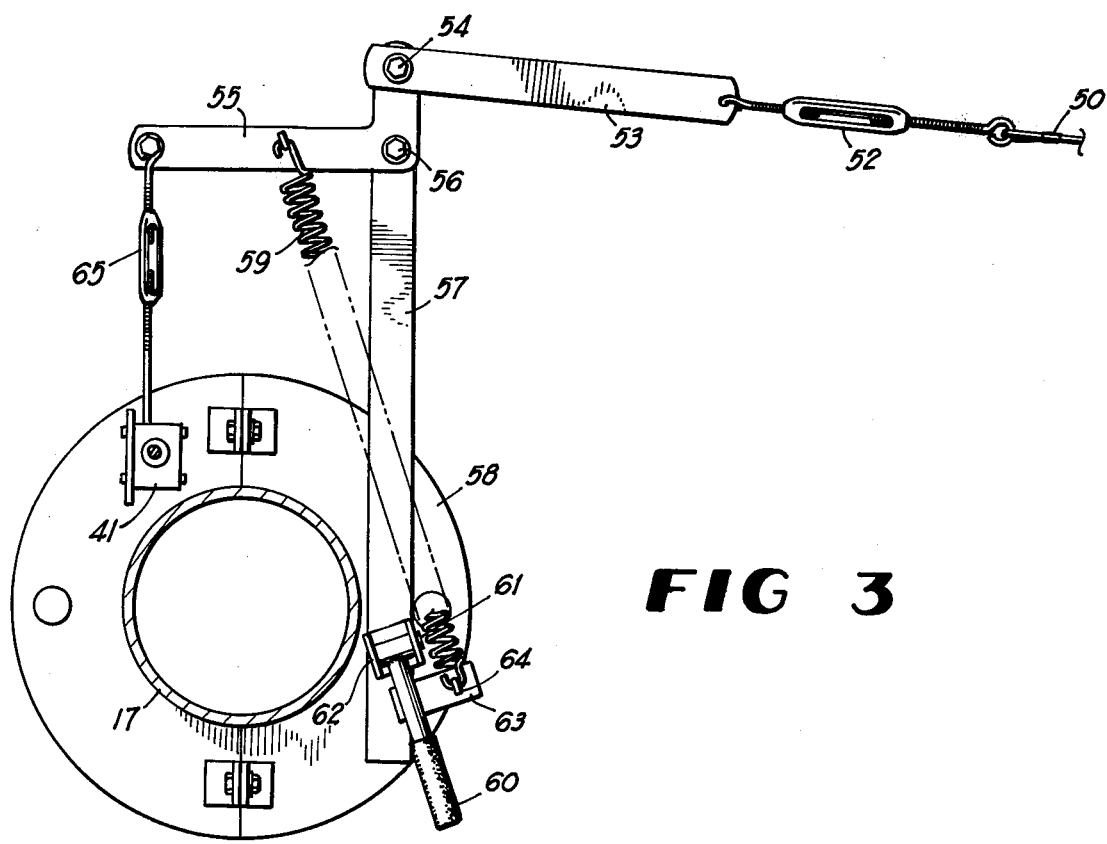
FIG. 3 is a plan view of the structure shown in FIG. 2, partly in section.

Referring to FIG. 4, the independent drive motor 37' which is a reversible motor is connected by wires 40 to the generator 24 and a forward mode control switch 41 for the motor 37' also shown in FIGS. 2 and 3. The motor 37' is further connected through a wire 42 to a reverse mode switch 43, as illustrated in FIG. 4.

The motors 37 of intermediate wheeled towers 11 are under control of forward mode switches 44 and reverse mode switches 45 preferably contained in switch housings 46, FIG. 1, adjacent to the respective towers 11 of the system.

A control wire or cable 47, FIG. 4, has one end 48 secured fixedly to the end tower 12 and its opposite end secured to the prime mover tower 10 through a retractile spring 49 of constant tension. The control cable 47, which is a mechanical device, passes between the paired control switches 44 and 45 of the intermediate towers 11 and is adapted to trip the actuators of these switches in a manner to be further described.

Another mechanical control cable 50 has one end thereof secured at 51 to the first intermediate tower 11, FIG. 4, and has its other end connected to an adjusting turnbuckle 52, in turn attached to a link 53, FIGS. 2 and 3, which link is connected at 54 to one arm of a bell crank 55. The bell crank 55 is pivotally supported at 56 on an arm 57, welded or otherwise fixedly secured to a flange 58 of the standpipe 17 on prime mover tower 10. A retractile spring 59 exerts a constant tension on the bell crank 55 which in turn exerts tension on the mechanical control cable 50. The tension exerted by the spring 59 on the control cable 50 can be quickly released by raising a release handle 60 pivotally connected as at 61 to a U-bracket 62 fixed to the arm 57. An extension plate 63 projecting from one side of the handle 60 has one end of the tension spring 59 coupled thereto by means of a hook element 64. Therefore, when the handle 60 is raised, the extension plate 63 swings upwardly with it to release the tension of the spring 59. The control switch 41 for electric motor 37' may have its sensitivity adjusted by means of a turnbuckle 65 interconnecting bell crank 55 and the switch 41, FIGS. 2 and 3.

OPERATION

The electric motor 25 which operates the winch spool 29 of prime mover tower 10 is set by an operator via a conventional percentage timer, not shown, to drive the motor 25 intermittently at whatever percentage of time is desired in a given irrigation situation. For example, if the motor 25 is set through the percentage timer at 50%, it will operate for 15 seconds and then stop for 15 seconds intermittently in a repetitive cycle. (30 seconds of operation is equal to 100%). When the motor 25 is thus energized, the tower 10 moves forwardly along the cable 30 for an interval and then stops. When this occurs, the additional tension developed through the mechanical cable 50 connected to the still stationary first intermediate tower 11 turns the bell crank 55 sufficiently on its pivot to close the forward mode control switch 41 for the electric drive motor 37' of the end or last wheeled tower 12. When this occurs, the end tower 12 will advance forwardly until the switch 41 reopens, at which time the end tower 12 will have moved into lateral alignment with the prime mover tower 10 and will stop.

At approximately the same time, with minimal lag, the forward mode switches 44 for the drive motors 37 of intermediate towers 11 will be closed due to the pulling forward of the mechanical cable 47 whose ends are attached to the towers 10 and 12. The forward movement of the cable 47 trips the actuators of the switches 44 to close them and all intermediate towers 11 are then advanced by their motors 37 until they are laterally aligned again with the towers 10 and 12. When the tension on the cable 47 is relaxed, the control switches 44 reopen to stop the drive motors 37 which are drivingly coupled with the wheels 38 of the intermediate towers 11. The cycle of operation repeats in the same manner when the motor 25 is again started up by the percentage timer, not shown.

As previously stated, the motors 37 and 37' are reversible motors, and switches 45 control the motors 37 in the reverse mode when actuated by reverse movement of the taut cable 47 responsive to reverse travel thereof. Wire 42 is energized to operate the motor 37' in reverse when reverse switch 43 is closed.

In actuality, the entire irrigation apparatus will traverse a field in a linear path without any discernible lag of the various wheeled towers 11 and 12 behind one another or behind prime mover tower 10. Each time the prime mover tower 10 advances an increment, the end tower 12 will respond to the closing of switch 41 by the action of cable 50 and bell crank 55 and advance to a laterally aligned position with the prime mover tower and stop automatically as the cable 50 again slackens to reopen switch 41. This parallel advancing of the wheeled towers 10 and 12 causes bowing of the cable 47 sufficient to close the switches 44 of drive motors 37, whereby all intermediate towers 11 will advance into alignment with the towers 10 and 12 and stop when the cable 47 straightens out and opens all switches 44. The net effect is that the entire apparatus advances as if under control of a single drive means the lag of the towers 11 and 12 relative to the prime mover tower is not even noticeable.

The apparatus is characterized by simplicity of construction and operation and therefore comparatively low cost. The apparatus can be stopped at any point during its linear traverse of a field and turned 90 degrees about a vertical pivot axis defined by the standpipe 17 for the purpose of reaching offset areas of the field which would be out of line of the main progression of the apparatus. A variety of irrigation patterns can be achieved with the apparatus.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A crop irrigating apparatus comprising a prime mover wheeled tower, a plurality of laterally spaced intermediate wheeled towers and a laterally spaced end wheeled tower all in substantially transverse alignment with the prime mover wheeled tower, a standpipe for irrigation water on the prime mover tower adapted for connection at its bottom with a water supply hose, a generally horizontal irrigation conduit coupled with the top of the standpipe and extending substantially horizontally from the prime mover wheeled tower and toward and across the intermediate and end wheeled towers, said irrigation conduit being flexibly jointed at intervals, supporting truss sections for the flexibly jointed irrigation conduit between the prime mover tower, intermediate and end wheeled towers, said irrigation conduit having irrigation water outlets at multiple points along its length, independent electric drive motors for the wheels of the intermediate and end wheeled towers on such towers, an engine on the prime mover wheeled tower, an electrical generator means coupled with and driven by the engine, and an electric motor powered by the generator means on the prime mover wheeled tower, a winch means on the prime mover tower driven by the electric motor on such tower and including a cable winding winch spool carrying a cable adapted to be anchored in the ground at a point distant from the apparatus for guidance of the apparatus on a linear path, steering means for the prime mover tower guidingly engaged with said cable, a control switch for the electric motor of said end wheeled tower on the prime mover tower, a bell crank coupled to said control switch on the prime mover tower, a tensioned mechanical cable interconnecting said bell crank and the first intermediate wheeled tower away from the prime mover tower, forward mode control switches for the electric motors of the intermediate towers near the intermediate towers, and a tensioned mechanical cable connected between the prime mover tower and said end wheeled tower and adapted to engage and close the last-named control switches in response to intermittent forward movements of said prime mover and end wheeled towers.

2. A crop irrigating apparatus as defined in claim 1, and reverse mode switches for the electric motors of the intermediate wheeled towers near the intermediate wheeled towers and adapted to be engaged and closed by reverse movement of the second-named tensioned mechanical cable.

3. A crop irrigating apparatus as defined in claim 2, and the forward and reverse mode control switches for the electric motors of the intermediate wheeled towers being arranged in pairs forwardly and rearwardly of the second-named tensioned mechanical cable.

4. A crop irrigating apparatus as defined in claim 3, and a retractile spring connected in said second-named tensioned mechanical cable.

5. A crop irrigating apparatus as defined in claim 1, and a tension spring coupled with said bell crank and biasing it in a direction to exert tension on the first-named tensioned mechanical cable.

6. A crop irrigating apparatus as defined in claim 5, and manual means connected with the last-named tension spring to quickly release the tension thereof.

7. A crop irrigating apparatus as defined in claim 1, and an adjustable connection between said bell crank and said control switch for the electric motor of said end wheeled tower.

8. A crop irrigating apparatus comprising prime mover, plural intermediate and end wheeled towers in laterally spaced relationship, an overhead irrigation conduit supported by said towers and being flexibly jointed near said towers and having plural spaced irrigating water outlets, a standpipe for irrigating water on the prime mover tower and being coupled with said conduit, independent electric drive motors for said plural intermediate and end towers on such towers, a winch spool and apparatus guidance cable on the prime mover tower, an electric drive motor for said winch spool on the prime mover tower, engine generator means on the prime mover tower operatively connected with the electric drive motor for the winch spool, control switches for the electric drive motors of the plural intermediate towers near the plural intermediate towers, a control switch for the electric drive motor of said end tower on the prime mover tower, tension cable means interconnecting the last-named switch on the prime mover tower to the first intermediate tower away from the prime mover tower and second tension cable means interconnecting the prime mover and end towers and extending adjacent to said control switches for the electric drive motors of the plural intermediate towers, whereby such control switches are engaged and closed by said second tension cable means responsive to movements in one direction of said prime mover and end wheeled towers.

9. A crop irrigating apparatus as defined in claim 8, and the first-named tension cable means including a pivoted spring urged member on the prime mover tower interconnecting said control switch for the electric drive motor of said end tower with a mechanical cable connected to the first intermediate tower.

10. A crop irrigating apparatus as defined in claim 8, and articulated supporting truss sections for the flexibly jointed irrigation conduit extending between and supported by said towers.

11. A crop irrigating apparatus comprising a prime mover wheeled tower, plural intermediate wheeled towers and an end wheeled tower in laterally spaced relationship, a generally horizontal irrigation conduit supported on said towers and having plural spaced irrigating water outlets, power drive means for the prime mover tower on such tower, independent electric drive motors for said intermediate and end towers on such towers, and electromechanical control means for said electric drive motors including a connection between the prime mover tower and said end tower and another connection between the prime mover tower and one intermediate tower, and said electro-mechanical control means responding to movements of the prime mover tower to cause said end tower and then said intermediate towers to move into lateral alignment with the prime mover tower.

* * * * *